(12) United States Patent
Nemati et al.

(10) Patent No.: US 10,593,162 B2
(45) Date of Patent: Mar. 17, 2020

(54) TRANSPARENT ROLLING PLATFORM FOR ITEM SCANNING TUNNEL

(71) Applicant: Walmart Apollo, LLC, Bentonville, AR (US)

(72) Inventors: Behzad Nemati, Springdale, AR (US); Deepti Bisht, Bentonville, AR (US); Kyle Mchan, Fayetteville, AR (US); Arnabh Bhaumik, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 16/383,524

(22) Filed: Apr. 12, 2019

(65) Prior Publication Data

US 2019/0325712 A1 Oct. 24, 2019

Related U.S. Application Data

(60) Provisional application No. 62/659,654, filed on Apr. 18, 2018.

(51) Int. Cl.
*C07G 1/00* (2011.01)
*G06K 7/10* (2006.01)
(Continued)

(52) U.S. Cl.
CPC ......... *G07G 1/0045* (2013.01); *G07G 1/0018* (2013.01); *G06K 7/10297* (2013.01);
(Continued)

(58) Field of Classification Search
CPC ............................ G07G 1/0045; G07G 1/0018
(Continued)

(56) References Cited

U.S. PATENT DOCUMENTS

| 3,603,679 A | 9/1971 | Davis |
| 5,495,097 A | 2/1996 | Katz et al. |

(Continued)

FOREIGN PATENT DOCUMENTS

| CN | 103699911 A | 4/2014 |
| CN | 103294979 B | 8/2016 |

(Continued)

OTHER PUBLICATIONS

Young, Lee W., "International Search Report", International Application No. PCT/US2019/027392, dated Jul. 8, 2019, 2 pages.

(Continued)

*Primary Examiner* — Allyson N Trail

(57) ABSTRACT

Examples provide a transparent scan platform within an item scanning tunnel on the same plane as a set of conveyor belts. The transparent scan platform includes a plurality of interconnected transparent segments or a transparent band forming a continuous transparent platform rotating about a set of rollers. The transparent scan platform includes a scan device embedded within the platform or positioned under the transparent scan platform. The scan device scans an item identifier, such as a barcode, located on an item sitting on a top surface of the transparent scan platform. The transparent scan platform rolls the item out of the scanning tunnel. If the item becomes wedged between an end of the scan platform and an end of a conveyor belt, a sweeper device extends downward behind the item and sweeps the item out of the scanning tunnel. The sweeper device then retracts back upward.

20 Claims, 13 Drawing Sheets

(51) Int. Cl.
*G07G 1/00* (2006.01)
*G06K 7/14* (2006.01)

(52) U.S. Cl.
CPC ......... *G06K 7/1413* (2013.01); *G06K 7/1417* (2013.01); *G06K 2007/10504* (2013.01)

(58) Field of Classification Search
USPC .............................. 235/383, 462.01, 462.34
See application file for complete search history.

(56) References Cited

U.S. PATENT DOCUMENTS

| | | | |
|---|---|---|---|
| 5,543,607 A * | 8/1996 | Watanabe | A47F 9/048 186/61 |
| 6,360,947 B1 * | 3/2002 | Knowles | G02B 26/10 235/462.01 |
| 7,387,241 B2 | 6/2008 | Hassenbuerger | |
| 9,053,379 B2 | 6/2015 | Olmstead et al. | |
| 9,412,124 B2 | 8/2016 | Bonner et al. | |
| 2002/0170850 A1 | 11/2002 | Bonham et al. | |
| 2011/0238205 A1 | 9/2011 | Kemp et al. | |
| 2015/0107967 A1 | 4/2015 | Horn | |
| 2018/0218224 A1 * | 8/2018 | Olmstead | G08B 13/19643 |
| 2019/0019191 A1 * | 1/2019 | Jung | G06Q 20/4014 |

FOREIGN PATENT DOCUMENTS

| | | |
|---|---|---|
| EP | 0999513 B1 | 5/2004 |
| EP | 1066587 B1 | 11/2007 |
| EP | 2248116 A1 | 11/2010 |

OTHER PUBLICATIONS

Young, Lee W., "Written Opinion", International Application No. PCT/US2019/027392, dated Jul. 8, 2019, 6 pages.

* cited by examiner

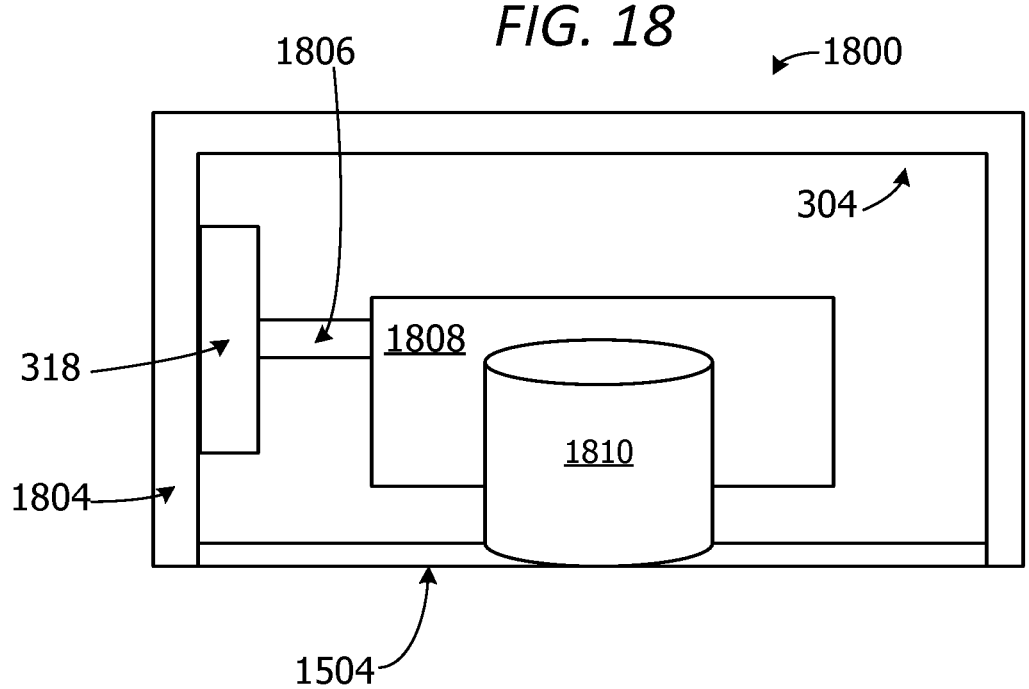
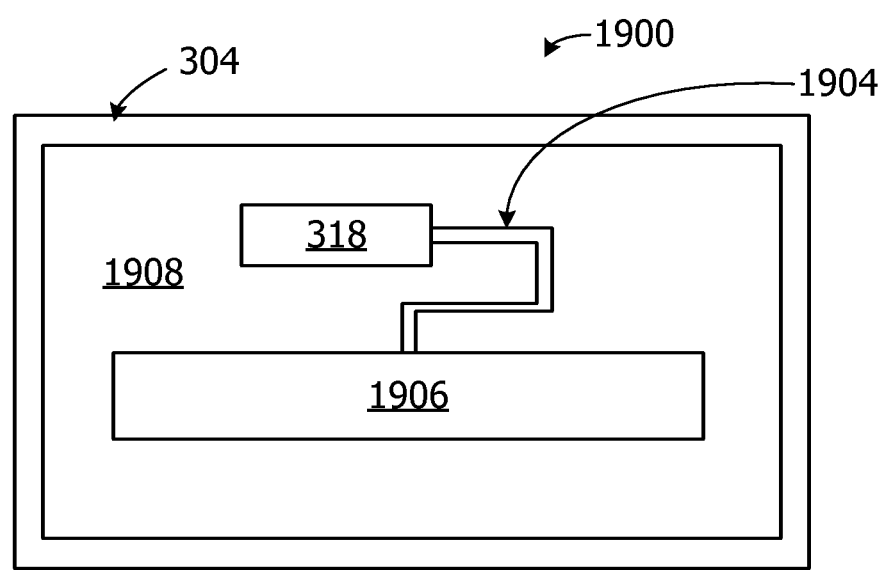

TRANSPARENT ROLLING PLATFORM FOR ITEM SCANNING TUNNEL

BACKGROUND

A checkout point for a grocery store or other retail environment typically involves a customer or a checkout clerk taking each item individually, visually inspecting the item to locate a barcode on the item, and manually scanning the barcode via a handheld scanning device or a stationary scanning device. This is a tedious and time-consuming process. If the customer using a self-checkout station is unable to locate the barcode or correctly scan the barcode within a reasonable amount of time, the scanning process can become a frustrating trial-and-error procedure.

SUMMARY

Some examples provide a system for scanning items via an item scanning tunnel. The system includes a first conveyor belt moving at least one item towards a scanning tunnel. The scanning tunnel includes a first side member, a second side member, a top member, and a rolling transparent scan platform. The rolling transparent platform is on the same horizontal plane as the first conveyor belt. The first conveyor belt moves the at least one item into the scanning tunnel. An interior surface of the item scanning tunnel includes scan devices. One of the scan devices is a scan device associated with the rolling transparent scan platform. The scan devices generate scan data associated with an item inside the scanning tunnel. The rolling transparent scan platform includes a plurality of transparent segments. A first segment in the plurality of transparent segments includes a first side member and a second side member. The first side member is attached to a second segment. The second side member is attached to a third segment. The plurality of transparent segments forms a continuous transparent band rotating about a set of rollers. A scan device includes a first side connected to the first side member of the scanning tunnel and a main body of the scan device extending between the set of rollers within the continuous transparent band. The scan device scans an item identifier on a surface of the at least one item in contact with the rolling transparent scan platform through a subset of transparent segments within the plurality of transparent segments. The rolling transparent scan platform moves the item toward an exit point of the scanning tunnel onto a second conveyor belt. The second conveyor belt is on the same horizontal plane as the rolling transparent scan platform. A sweeper device includes an attachment point on a first end of an extension arm. The attachment point connects to a portion of the interior surface of the item scanning tunnel. A sweeper head connects to a second end of the extension arm. The extension arm extends the sweeper head downward behind the item and sweeps the item onto the second conveyor belt if the item becomes lodged in a gap between the rolling transparent scan platform and the second conveyor belt. The sweeper device retracts upward if the scan data indicates the item is outside the scanning tunnel.

Other examples provide an item scan device including an item scanning tunnel. A first conveyor belt moves a first item into a scanning tunnel. The scanning tunnel includes a first side member having at least one sensor device attached to an interior surface of the first side member. A second side member includes at least one sensor device attached to an interior surface of the first side member. A top member includes at least one sensor device attached to an interior surface of the first side member. A transparent conveyor belt on the same horizontal plane as the first conveyor belt moves at the same speed as the first conveyor belt. The transparent conveyor belt includes a continuous transparent band of flexible material rotating about a set of rollers. A sensor device includes a first side connected to the first side member of the scanning tunnel. A main body of the sensor device extends between the set of rollers. The sensor device is positioned below an upper portion of the continuous transparent band and above a lower portion of the continuous transparent band. The sensor device generates sensor data associated with an item identifier on a surface of an item in contact with an exterior surface of the upper portion of the continuous transparent band. The transparent conveyor belt moves the item toward an exit point of the scanning tunnel onto a second conveyor belt. The second conveyor belt is on the same horizontal plane as the transparent conveyor belt. A sweeper device includes an attachment point on a first end of an extension arm connected to a portion of the interior surface of the item scanning tunnel. A sweeper head is connected to a second end of the extension arm. The extension arm extends the sweeper head downward behind the item. The sweeper head sweeps the item onto the second conveyor belt if the item becomes lodged in a gap between the transparent conveyor belt.

Still other examples provide a transparent scan platform within an item scanning tunnel. A transparent rolling scan platform includes the item scanning tunnel includes a first side member, a second side member, a top member, and a rolling transparent scan platform. The rolling transparent scan platform includes a plurality of transparent segments. A first segment in the plurality of transparent segments includes a first side member and a second side member. The first side member is attached to a second segment. The second side member of the first segment is attached to a third segment. The plurality of transparent segments forms a continuous band rotating about a set of rollers. A scanner device is positioned below the rolling transparent scan platform. The scanner device scans an item identifier on a surface of the at least one item in contact with the rolling transparent scan platform through a subset of transparent segments within the plurality of transparent segments. The rolling transparent scan platform moves the item toward an exit point of the scanning tunnel and onto a second conveyor belt on the same horizontal plane as the rolling transparent scan platform.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 18 is an exemplary block diagram illustrating a cross-section view of a scanning tunnel including a fully extended sweeper device attached to a side member of the scanning tunnel.

FIG. 19 is an exemplary block diagram illustrating a cross-section view of an interior side wall of a scanning tunnel including a fully retracted sweeper device.

Corresponding reference characters indicate corresponding parts throughout the drawings.

DETAILED DESCRIPTION

Referring to the figures, examples of the disclosure enable an item scanning system including a transparent rolling scan platform for scanning a portion of an item in contact with a surface of the transparent rolling scan platform. In some examples, the system includes a sweeper device for moving items onto the transparent rolling scan platform and/or moving items off the transparent rolling scan platform. This enables faster and more accurate item scanning without human intervention. The item scanning system further provides more efficient and customer friendly item scanning.

Figure 1:
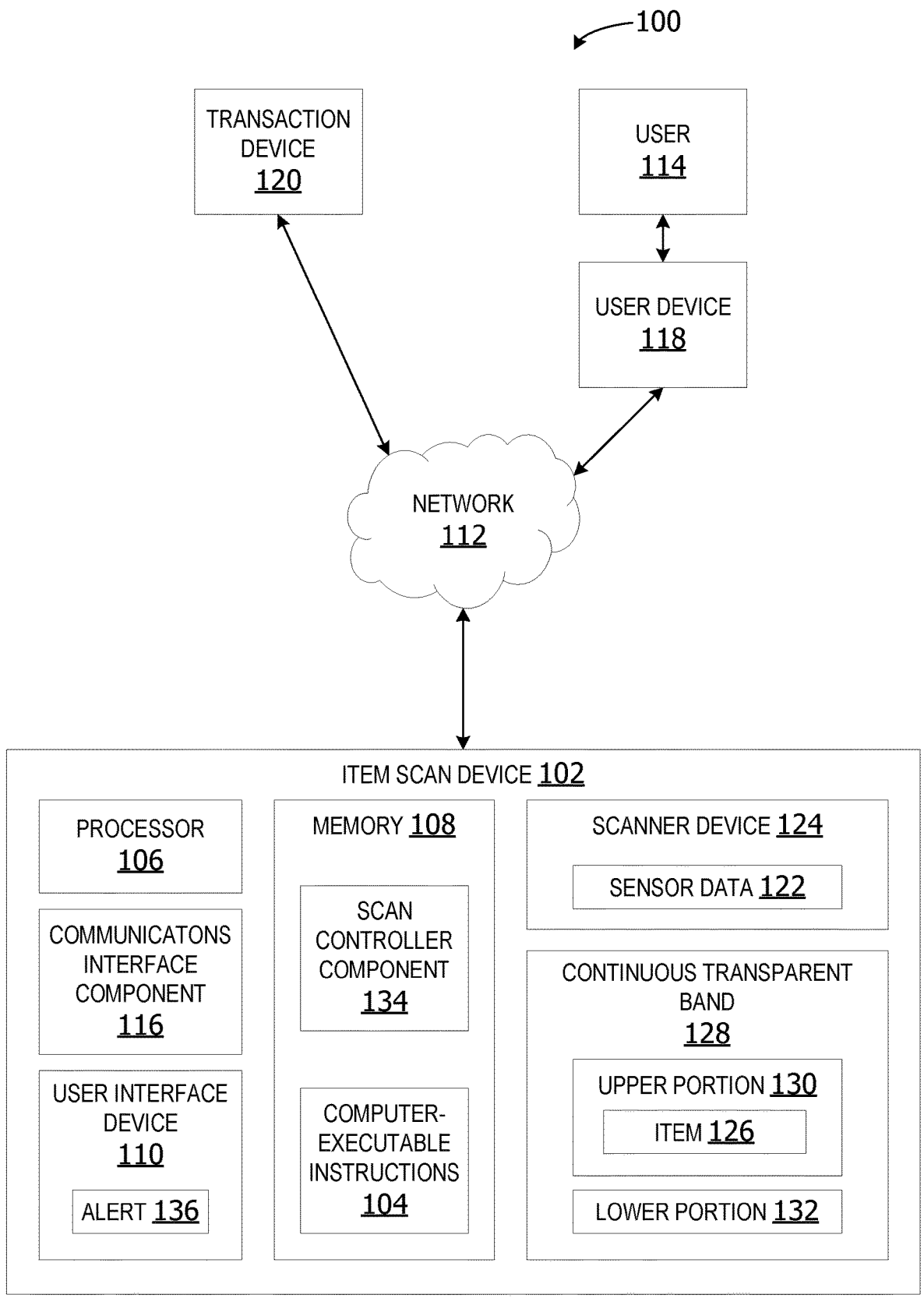
FIG. 1 is an exemplary block diagram illustrating an item scanning system.

Referring again to FIG. 1, an exemplary block diagram illustrates an item scanning system 100 for autonomously scanning items within a scanning tunnel. In the example of FIG. 1, the item scan device 102 is a scanning device associated with an item checkout at a retail location, such as a store. The item scan device 102 includes at least one processor 106 and a memory 108 for executing computer-executable instructions 104. The item scan device 102 can also include a user interface device 110.

The processor 106 includes any quantity of processing units and is programmed to execute the computer-executable instructions 104. The computer-executable instructions 104 can be performed by the processor 106 or by multiple processors within the item scan 102 or performed by a processor external to the item scan 102. In some examples, the processor 106 is programmed to execute instructions such as those illustrated in the figures (e.g., FIG. 20).

The item scan device 102 further has one or more computer-readable media such as the memory 108. The memory 108 includes any quantity of media associated with or accessible by the computing device 102. The memory 108 can be internal to the item scan device 102 (as shown in FIG. 1), external to the item scan device (not shown), or both (not shown). In some examples, the memory 108 includes read-only memory and/or memory wired into an analog computing device.

The memory 108 stores data, such as one or more applications. The applications, when executed by the processor 106, operate to perform functionality on the item scan device 102. The applications can communicate with counterpart applications or services such as web services accessible via a network 112. In some examples, the applications represent downloaded client-side applications that correspond to server-side services executing in a cloud.

In other examples, the user interface device 110 includes a graphics card for displaying data to a user 114 and receiving data from the user 114. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. For example, the user can input commands or manipulate data by moving the item scan device 102 in one or more ways.

The network 112 is implemented by one or more physical network components, such as, but without limitation, routers, switches, network interface cards (NICs), and other network devices. The network 112 can be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 116. The communications interface component 116 includes a network interface card and/or computer-executable instructions (e.g., a driver) for operating the network interface card. Communication between the item scan device 102 and other devices, such as but not limited to a user device 118 and/or a transaction device 120, can occur using any protocol or mechanism over any wired or wireless connection. In some examples, the communications interface component 116 is operable with short range communication technologies such as by using near-field communication (NFC) tags.

The user device 118 represent any device executing computer-executable instructions. The user device 118 can be implemented as a mobile computing device, such as, but not limited to, a wearable computing device, a mobile telephone, laptop, tablet, computing pad, netbook, gaming device, and/or any other portable device. The user device 118 includes at least one processor and a memory. The user device 118 can also include a user interface device 110.

The transaction device 120 is a device for completing a transaction associated with a purchase of one or more items. In some examples, the transaction device 120 includes a point-of-sale (POS) device or any other checkout device. The transaction device 120 in this example receives sensor data 122 generated by a scanner device 124 via the network 112. In other examples, the transaction device 120 is associated with or otherwise connected to the item scan device 102. In these examples, the transaction device 120 receives the sensor data 122 directly from the item scan device via a wired connection.

The scanner device 124 is a device for scanning an item 126 and/or an item identifier on the item 126 to generate the sensor data 122. The scanner device 124 can be implemented as any type of scanner, such as, but not limited to, a barcode reader, a radio frequency identifier (RFID) tag reader, a quick response (QR) code reader, a weight sensor, a matrix barcode reader, an image capture device, or a universal product code (UPC) code. The sensor data 122 generated by the scanner device124 can include UPC code data, RFID tag data, QR code data, image data, weight data, or any other type of data associated with the item 126.

In some examples, the scanner device 124 is located below a continuous transparent band 128. In other examples, the scanner device 124 is located between an upper portion 130 and a lower portion 132 of the continuous transparent band 128. The item 126 is scanned by the scanner device 124 while the item sits on the upper portion 130 of the continuous transparent band 128.

The memory 108 in some examples stores one or more computer-executable components. Exemplary components include a scan controller component 134. The scan controller component 134, when executed by the processor 106, to analyze the sensor data 122 to identify the item 126. In other examples, the scan controller component 134 analyzes the sensor data 122 to determine whether the item is successfully scanned. If not, the scan controller component 134 outputs an alert 136 to the user 114. The scan controller component 134 can optionally analyze the sensor data 122 to determine whether two or more items enter the item scan device 102. If multiple items enter the item scan device 102 simultaneously, the scan controller component 134 generates the alert 136.

The alert 136 can be output via the user interface device 110 in some examples. In other examples, the scan controller component 134 transmits the alert 136 to the user device 118 by the communications interface component 116.

The system provides a more efficient and accurate automated scanning of items. The transparent scan platform enables scanning items from all sides regardless of the position or orientation of the item within the scanning tunnel. The sweeper head enables more accurate guidance and positioning of items within the scanning tunnel.

Figure 2:
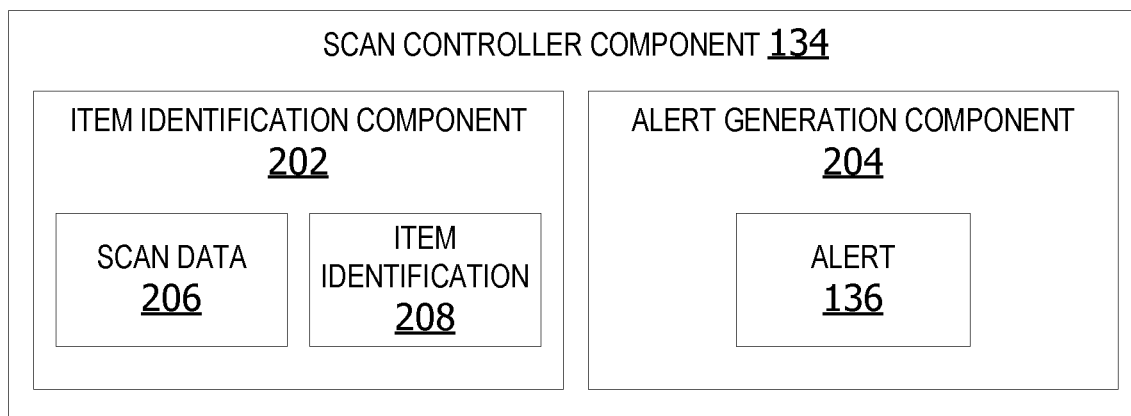
FIG. 2 is an exemplary block diagram illustrating a scan controller component.

FIG. 2 is an exemplary block diagram illustrating a scan controller component 134. The scan controller component 134 is a component for managing a scan device. The scan controller component 134 includes an item identification component 202 and an alert generation component 204.

The item identification component 202 analyzes scan data 206 to identify at least one item being scanned by an item scan device, such as, but not limited to, the item scan device 102 in FIG. 1. The scan controller component 134 sends the item identification 208 to a transaction component for use in completing a transaction for a user.

The alert generation component 204 generates an alert 210 if the analysis of the scan data 206 indicates multiple items entering a scanning tunnel of the item scan device simultaneously.

Figure 3:
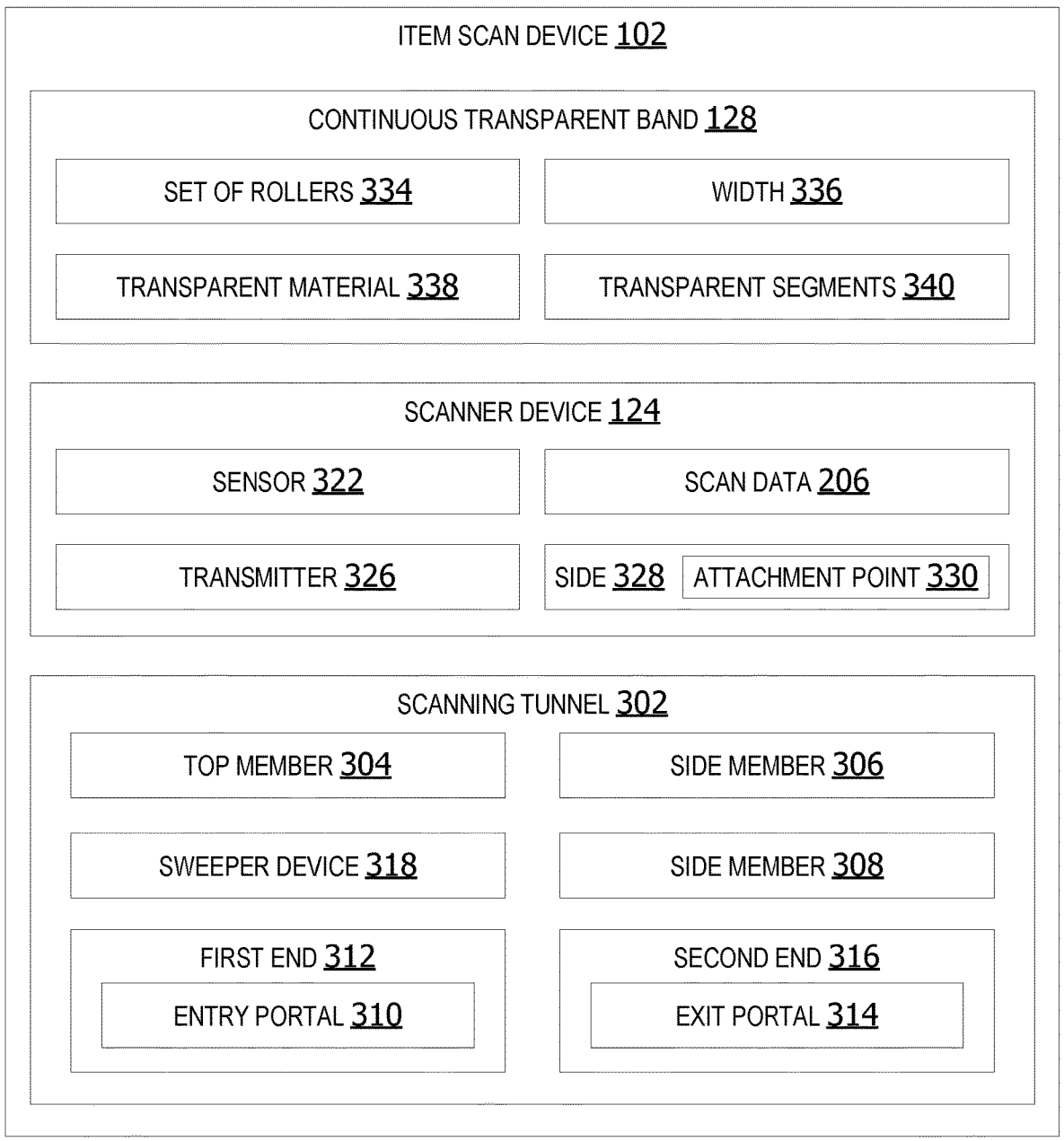
FIG. 3 is an exemplary block diagram illustrating an item scan device including a scanning tunnel.

FIG. 3 is an exemplary block diagram illustrating an item scan device 102 including a scanning tunnel 302. The scanning tunnel 302 includes a top member 304, a first side member 306 and a second side member 308 defining an entry portal 310 at a first end 312 of the scanning tunnel 302 and an exit portal 314 at a second end 316 of the scanning tunnel 302. The scanning tunnel 302 in some examples includes a sweeper device 318 in some examples.

A scanner device 124 includes a sensor 322 generating scan data 206 associated with an item in the item scan device 102. The scanner device 124 is a device such as, but not limited to, the scanner device 124 in FIG. 1. A transmitter 326 in some examples sends the scan data 206 to a transaction device, such as, but not limited to, the transaction device 120 in FIG. 1.

The scanner device 124 scans an item sitting on a continuous transparent band 128 rotating about a set of one or more rollers 334. The continuous transparent band 128 has a width 336 that is equal to a width of one or more conveyor belts associated with the scanning tunnel 302. In some examples, the width 336 of the continuous transparent band 128 is the same as the width of an item identifier on one or more items to be scanned via the item scan device 102.

The continuous transparent band 128 in some examples is a band of transparent material 338 that wraps around the set of rollers 334. The continuous transparent band 128 can be made of a flexible clear plastic or any other transparent flexible material forming a clear conveyor belt or rolling platform.

In other examples, the continuous transparent band 128 is composed of transparent segments 340 interconnected together to form a transparent band that wraps around the set of rollers 334. The segments are sized such that the interconnected segments bend and flex. The segments can be any length and width which permits the segments to form a flexible band when connected.

In some examples, each segment in the set of transparent segments 340 are approximately one inch wide and six inches long to form a continuous transparent band 128 of six inches in width 336. In other examples, each segment is a half inch wide and one foot long to form a continuous flexible band having a width 336 of one foot. In yet other non-limiting examples, each segment is a single centimeter wide and ten inches long to form a continuous flexible band that is ten inches in width. The examples are not limited to these examples. The transparent segments can be any width and length which is suitable to the type of items being scanned.

Figure 4:
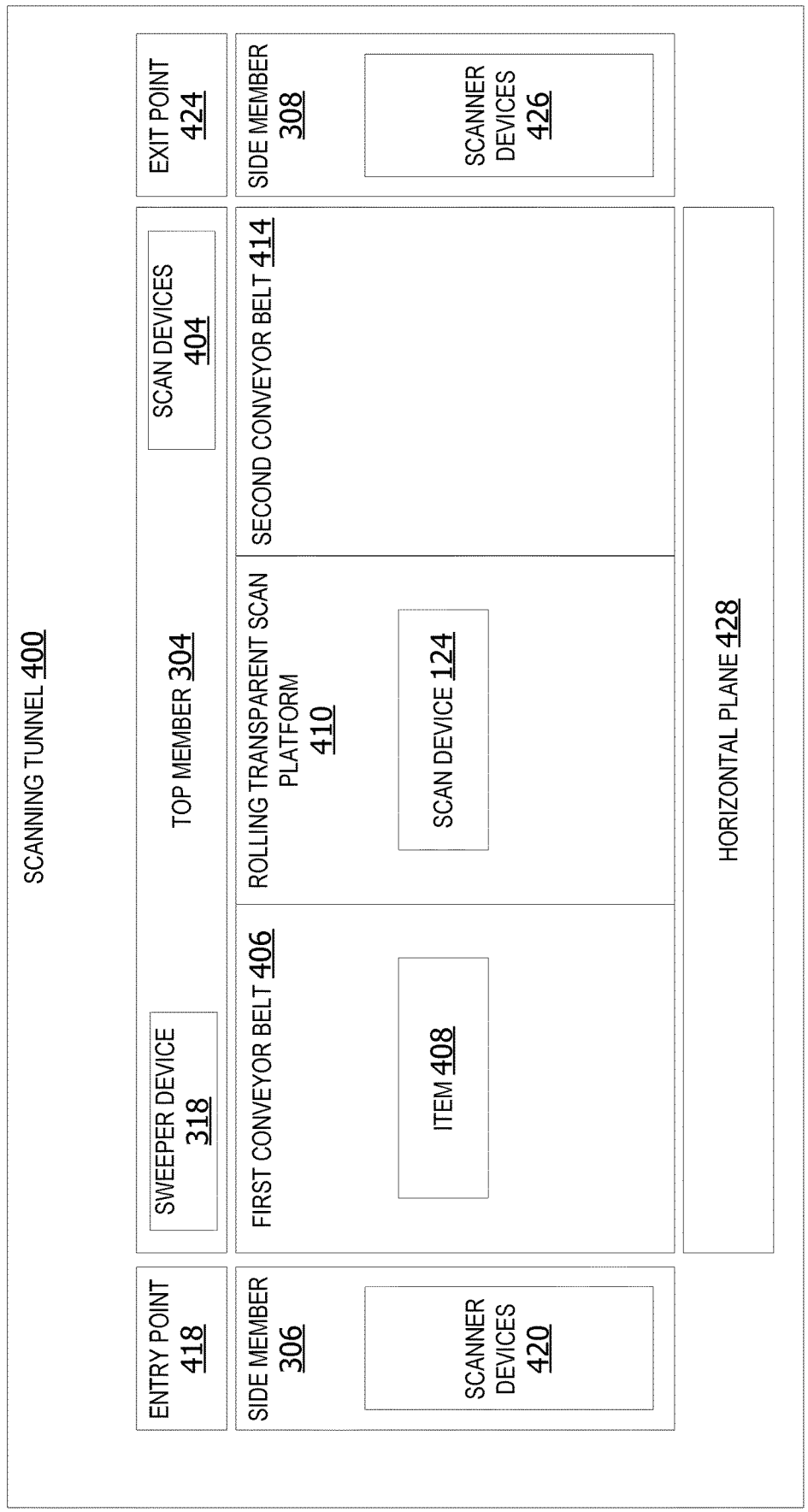
FIG. 4 is an exemplary block diagram illustrating a scanning tunnel.

FIG. 4 is an exemplary block diagram illustrating a scanning tunnel 400. The scanning tunnel 400 includes a top member 304. The top member 304 can optionally include one or more scanner devices 404 attached to an interior surface of the scanning tunnel 400 to scan an item located within the scanning tunnel 400. The scanner devices 404 can include one or more barcode scanners, such as the scanner device 124 in FIG. 1 and/or FIG. 3.

The top member 304, in other examples, can include a sweeper device 318 attached to the interior surface of the top member 304. The sweeper device 318 extends downward and behind an item 408 to push the item 408 off a first conveyor belt 406 and onto a rolling transparent scan platform 410. The rolling transparent scan platform 410 in some examples includes a continuous transparent band. In other examples, the rolling transparent scan platform is a platform comprising less-flexible glass or transparent plastic segments connected together to form a rolling, semi-rigid platform.

A scanner device 124 located below the rolling transparent scan platform 410 or within the rolling transparent scan platform 410 scans an item identifier on the item as the item 408 passes over the scanner device 124. After being scanned, the sweeper device 318 pushes the item 408 onto a second conveyor belt 414.

The scanning tunnel 400 includes a first side member 306 associated with an entry point 418 of the scanning tunnel 400. The side member 416 can include one or more scanner devices 420 attached to an interior surface of the side member 416. In some examples, the item 408 is placed on the first conveyor belt 406 at the entry point 418 of the scanning tunnel 400. The first conveyor belt 406 carries the item 408 into the scanning tunnel 400. Inside the scanning tunnel, 400, the item is scanned by one or more scanner devices attached to the first side member 306, the top member 304, the scanner device 124 beneath the rolling transparent scan platform 410, and/or one or more scanner devices 426 attached to an interior portion of a second side member 308 at an exit point 424 of the scanning tunnel 400.

In some examples, the rolling transparent scan platform 410 has an upper surface that is on the same horizontal plane 428 as the first conveyor belt 406 and the second conveyor belt 414. The rolling transparent scan platform 410 and the conveyor belts 406 and 414 move towards the exit point 424 of the scanning tunnel 400 at a uniform speed. This enables an item placed on the first conveyor belt 406 to move through the scanning tunnel across the conveyor belts and the rolling transparent scan platform 410 without human intervention or assistance.

Figure 5:
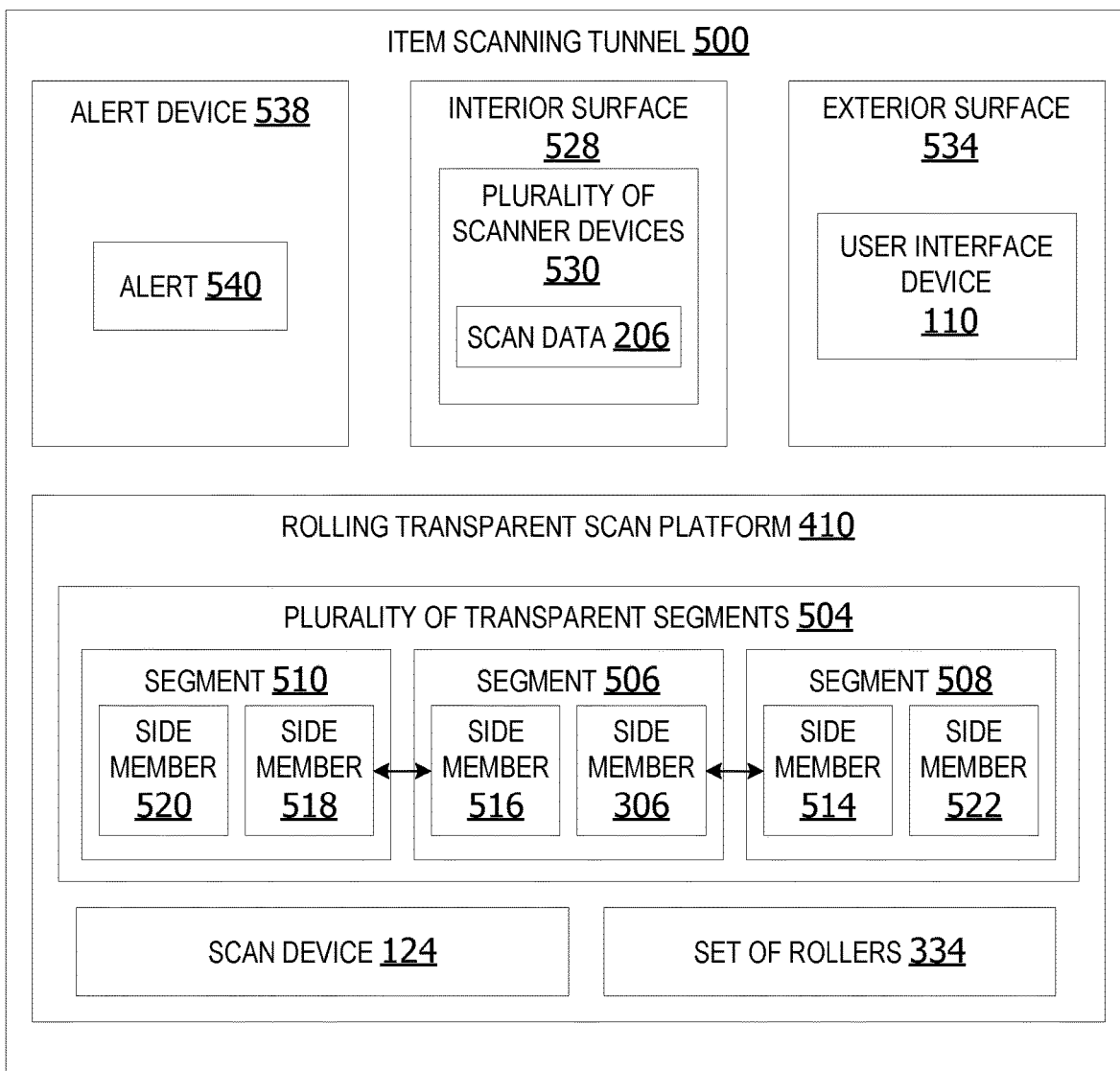
FIG. 5 is an exemplary block diagram illustrating a scanning tunnel including a rolling transparent scan platform.

FIG. 5 is an exemplary block diagram illustrating a scanning tunnel 500 including a rolling transparent scan platform 410. The rolling transparent scan platform 410 in some examples includes a plurality of transparent segments 504 interconnected together to form a transparent belt or band. The plurality of transparent segments 504 in this non-limiting example includes a first segment 506, a second segment 508 and a third segment 510. A first side member 306 of the first segment 506 is connected to a first side member 306 the second segment 508. The second side member 308 of the first segment 506 is connected to a first side member 306 of the third segment 510. The second side member 308 of the third segment 510 is connected to a side member of a fourth segment (not shown). Likewise, the second side member of the second segment 522 is connected to a side member of a fifth segment (not shown). In this manner, each segment is connected to two other segments to form a continuous band or belt. The plurality of transparent segments 504 are wrapped around a set of two rollers 334. In some examples, the set of rollers 334 includes one or more pulleys.

A scanner device 124 is located beneath a subset of the plurality of transparent segments. The scanner device 124 scans upward through the subset of transparent segments to generate scan data 206 associated with an item on the rolling transparent scan platform 410.

The item scanning tunnel 500 has an interior surface 528 which includes a plurality of sensor devices 530 pointing inward towards the item on the rolling transparent scan platform 410. The plurality of sensor devices 530 can include one or more scanner devices, such as, but not limited to, the scanner device 124 in FIG. 1.

The plurality of sensor devices 530 generates scan data 206 associated with the item inside the item scanning tunnel 500. The scan data 206 can include image data, UPC code data, barcode data, QR code data, RFID tag data, etc.

An exterior surface 534 of the item scanning tunnel can optionally include a user interface device 110 for outputting alerts and/or notifications to the user. The user interface device 110 can provide alerts indicating a failure to scan an item that already passed through the item scanning tunnel.

The item scanning tunnel 500 can optionally include an alert device 538 for outputting an alert 540 to the user. The alert device 538 can include a speaker, a light emitting diode (LED) screen, one or more lights, or any other type of alert device. The alert 540 can include an audible alert, such as a beeping sound. The alert 540 in other examples can include a flashing indicator light, a text display on an LED screen, an icon display, or any other type of alert.

Figure 6:
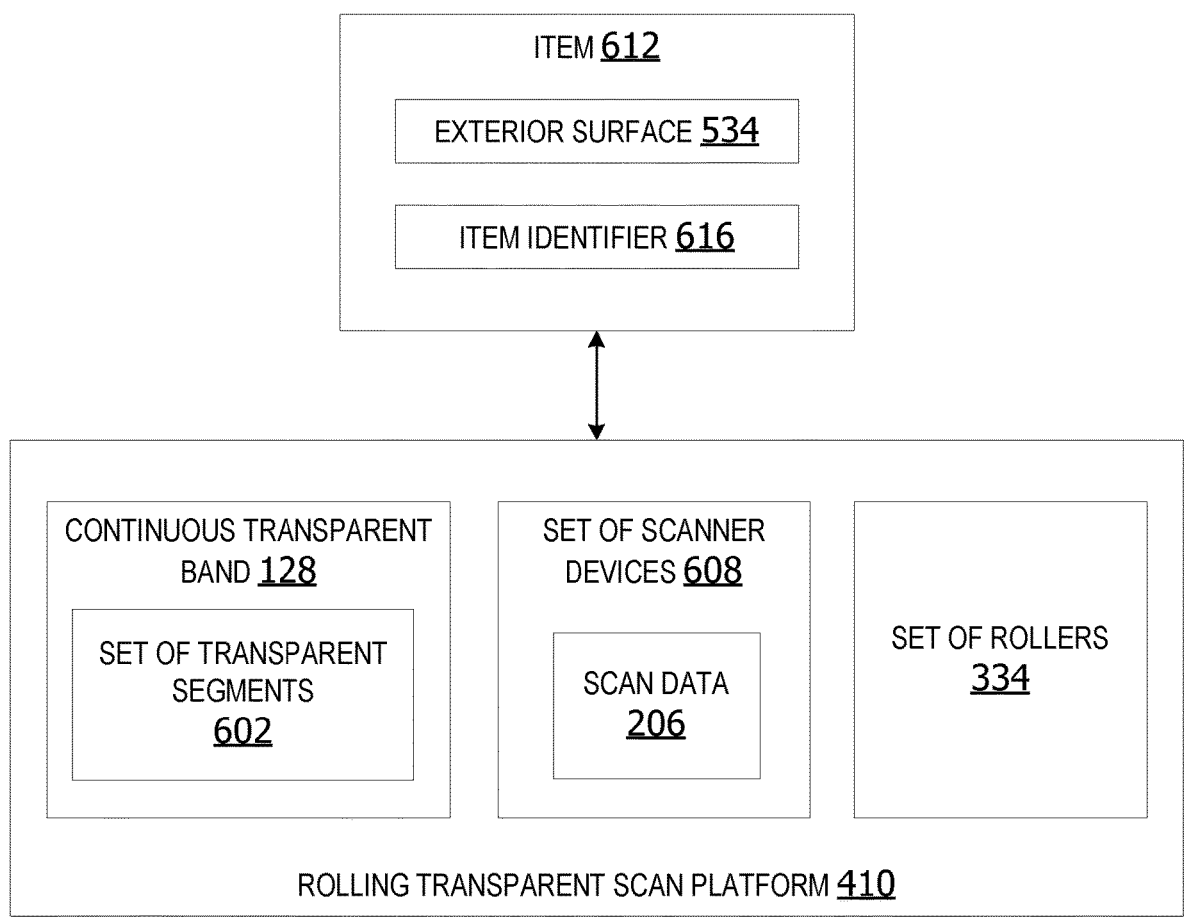
FIG. 6 is an exemplary block diagram illustrating a rolling transparent scan platform including a set of transparent segments.

FIG. 6 is an exemplary block diagram illustrating a rolling transparent scan platform 410 including a set of transparent segments 602. The set of transparent segments 602 forms a continuous transparent band 128 rolling around a set of one or more rollers 334. A set of one or more scanner devices 608 embedded within the rolling transparent scan platform 410 or located beneath the rolling transparent scan platform 410.

The set of scanner devices 608 generate scan data 206 associated with an item 612 on an exterior surface 534 of the rolling transparent scan platform 600. As the set of rollers 606 turns, the continuous transparent band 128 rolls or carries the item 612 across the set of scanner devices 608 away from an entry point of the scanning tunnel and toward an exit point of the scanning tunnel. As the item is moved along on the rolling transparent scan platform 410, the set of scanner devices 608 scans the item 612 from one or more directions.

The scan data 206 is data generated when the set of scanner devices 608 scans an item identifier 616 on the item 612. The item identifier 616 in this example is a UPC code or barcode. In other examples, the item identifier 616 is implemented as an RFID tag, a label, a watermark, a QR code, a matrix barcode, or any other type of item identifier.

Figure 7:
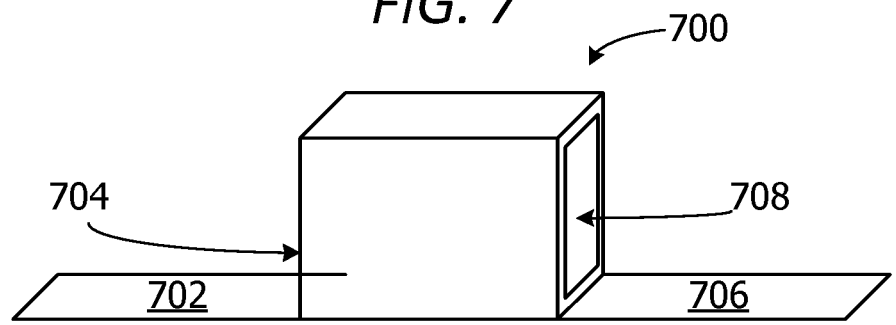
FIG. 7 is an exemplary block diagram illustrating a set of conveyor belts associated with a scanning tunnel.

FIG. 7 is an exemplary block diagram illustrating a set of conveyor belts associated with a scanning tunnel 700. A first conveyor belt 702 carries an item into an entry portal 704 of the scanning tunnel 700. A second conveyor belt 706 carries the item out through an exit portal 708 of the scanning tunnel 700.

Figure 8:
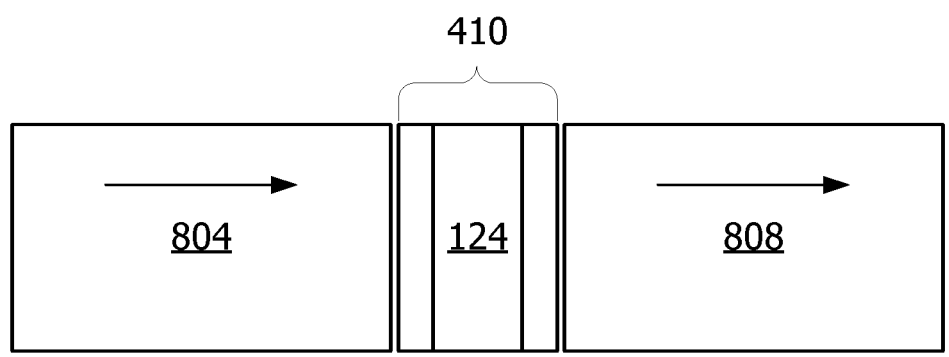
FIG. 8 is an exemplary block diagram illustrating a set of conveyor belts associated with a transparent scan platform.

FIG. 8 is an exemplary block diagram illustrating a set of conveyor belts 800 associated with a transparent scan platform 410. A first conveyor belt 804 carries an item towards the transparent scan platform 410. The transparent scan platform 410 rolls the item across a scanner device 124 beneath the transparent scan platform 410 and onto a second conveyor belt 808. The second conveyor belt 807 carries the item out of the scanning area and into an item bagging area.

Figure 9:
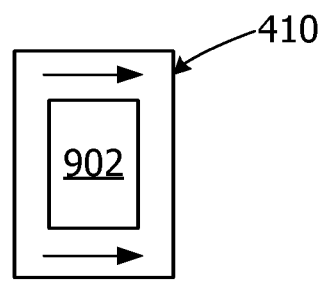
FIG. 9 is an exemplary block diagram illustrating a transparent scan platform.

FIG. 9 is an exemplary block diagram illustrating a transparent scan platform 410. The transparent scan platform 410 in this example is a transparent and flexible material that rolls over two or more rollers. The transparent scan platform 410 carries the item across the scanner device and towards an item bagging area.

Figure 10:
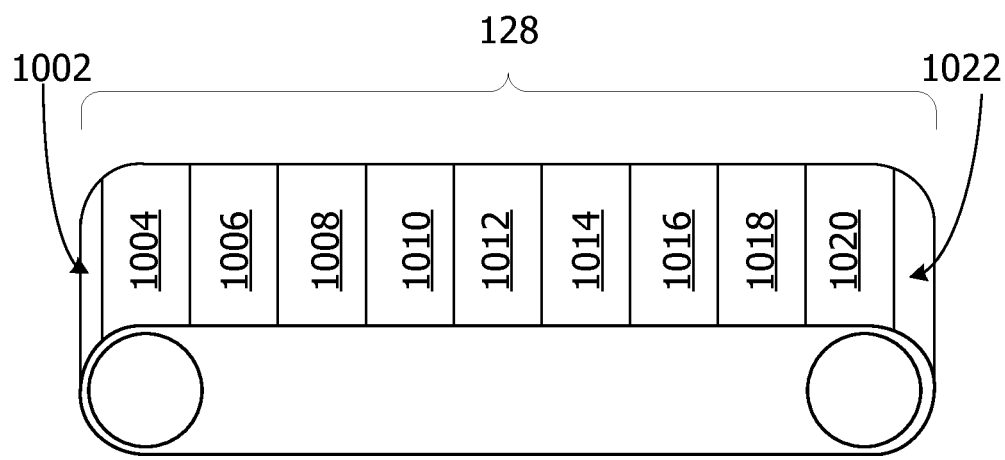
FIG. 10 is an exemplary block diagram illustrating a plurality of transparent segments forming a continuous transparent band rotating about a set of rollers.

FIG. 10 is an exemplary block diagram illustrating a plurality of transparent segments forming a continuous transparent band 128 rotating about a set of rollers. The continuous transparent band 128 is made of a plurality of interconnecting transparent segments. In this example, the continuous transparent band 128 includes segment 1102, 1104, 1106, 1108, 1110, 1112, 1114, 1116, 1118, 1120, and 1122 along an upper surface of the continuous transparent band 128. However, the examples are not limited to eleven segments along the upper surface of the continuous transparent band 128. The plurality of transparent segments can include any number of segments interconnected together.

Figure 11:
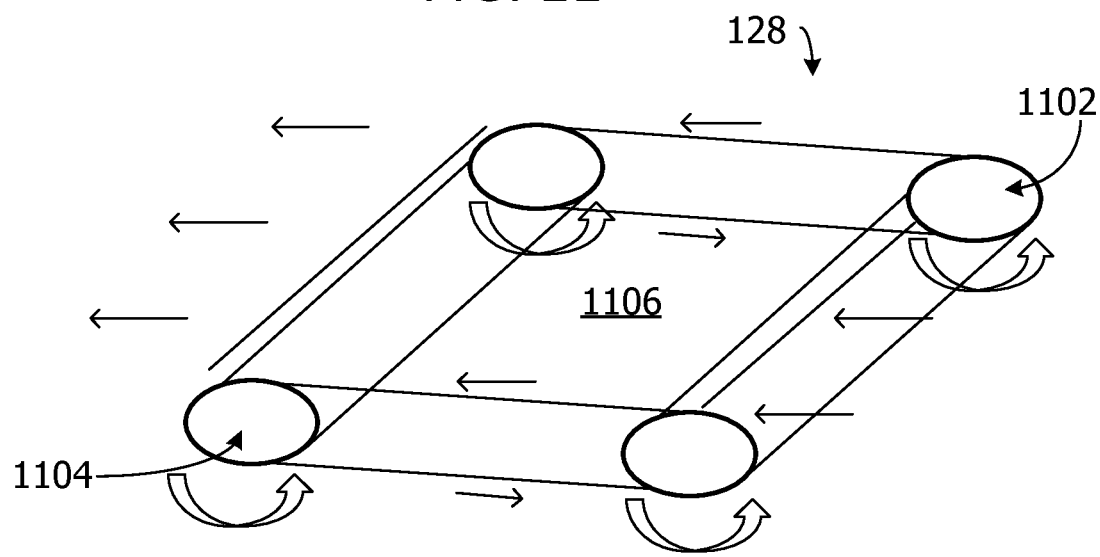
FIG. 11 is an exemplary block diagram illustrating a continuous transparent band rotating about a set of rollers.

FIG. 11 is an exemplary block diagram illustrating the continuous transparent band 128 of transparent material rotating about a set of rollers. The set of rollers includes a first roller 1102 and a second roller 1104. An item on an upper surface 1106 of the transparent material.

Figure 12:
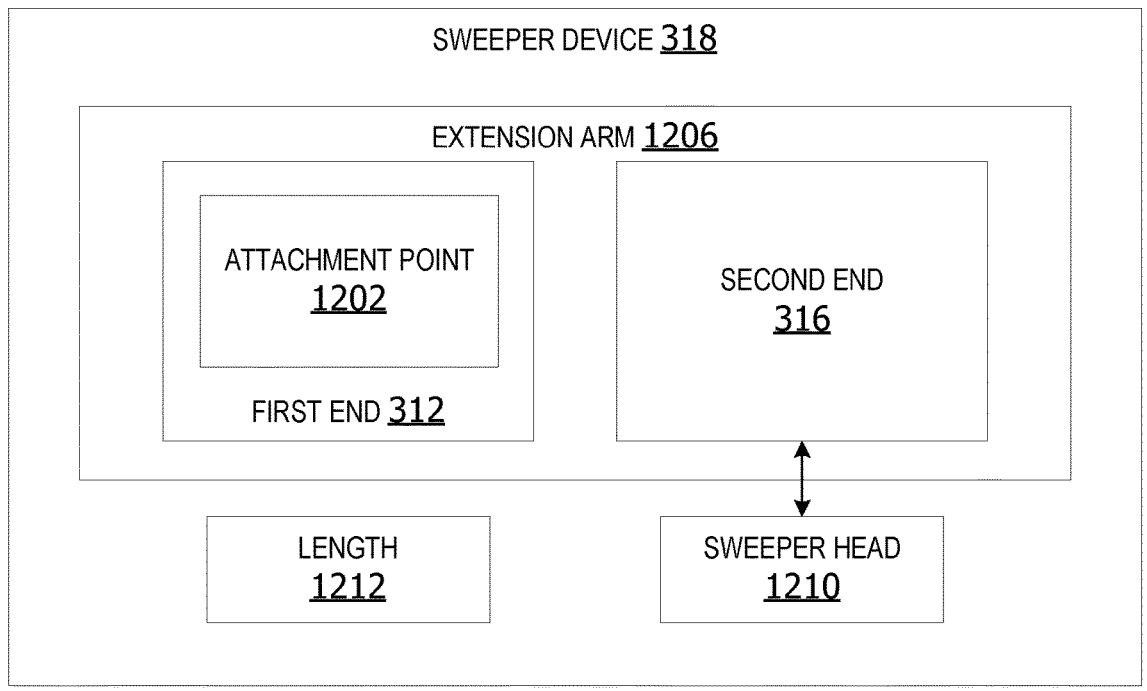
FIG. 12 is an exemplary block diagram illustrating a sweeper device.

FIG. 12 is an exemplary block diagram illustrating a sweeper device 318. The sweeper device 318 includes an attachment point 1202 at a first end 312 of an attachment arm 1206. The attachment point attaches the sweeper device 318 to an interior portion of the scanning tunnel. The sweeper device 318 can attach to an interior portion of a side member or an interior portion of a top member of the scanning tunnel, such as, but not limited to, the top member 304 in FIG. 3.

A second end 316 of the extension arm 1206 is connected to a sweeper head 1210. The sweeper head 1210 is a sweeper member for pushing an item onto the transparent scan platform or pushing an item off the transparent scan platform. The sweeper head 1210 in some non-limiting examples, has a length 1212 that is equal to the width of the transparent scan platform and/or the width of the conveyor belt(s).

Figure 13:
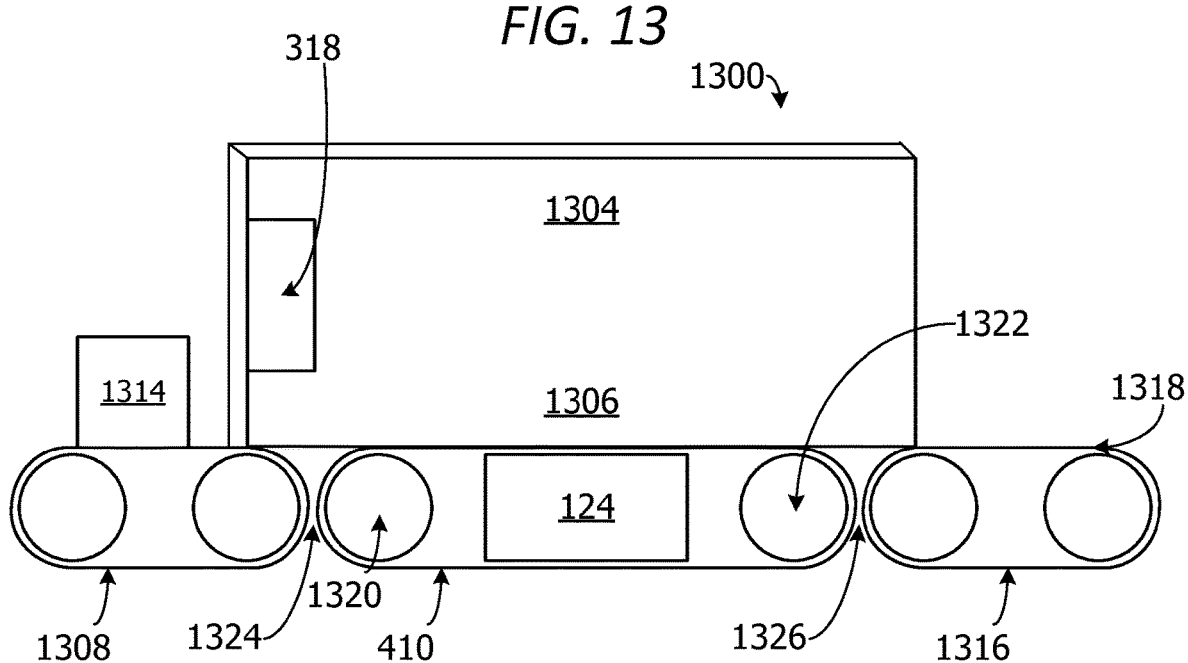
FIG. 13 is an exemplary block diagram illustrating a side cross-section view of a sweeper device attached to an interior portion of a side member of a scanning tunnel.

FIG. 13 is an exemplary block diagram illustrating a side cross-section view of a sweeper device 318 attached to an interior portion 1304 of a side member 1306 of a scanning tunnel 1300. A first conveyor belt 1308 moves an item 1314 into the scanning tunnel 1300 and onto a rolling transparent scan platform 410. A scanner device 124 embedded within the rolling transparent scan platform 410 scans the item 1314 as the item passes over the scanner device 124.

The rolling transparent scan platform 410 moves the item 1314 onto a second conveyor belt 1316. The first conveyor belt 1308, the second conveyor belt 1316 and the rolling transparent scan platform 410 are on the same horizontal plane 1318. The rolling transparent scan platform 410 wraps around a set of rollers, such as, but not limited to, the rollers 1320 and 1322.

If the item 1314 becomes stuck or wedged in a gap 1324 between the first conveyor belt 1308 or the rolling transparent scan platform 410, the sweeper device 318 extends downward and behind the item 1314. The sweeper device 318 moves the item 1314 onto the rolling transparent scan platform 410.

If the item 1314 becomes stuck or wedged in a gap 1326 between the rolling transparent scan platform 410 and the second conveyor belt 1316, the sweeper device 318 sweeps/pushes the item 1314 out of the gap and onto the second conveyor belt 1316. Once the item has exited the scanning tunnel 1300, the sweeper device 318 retracts and folds into a compressed formation against the side member.

Figure 14:
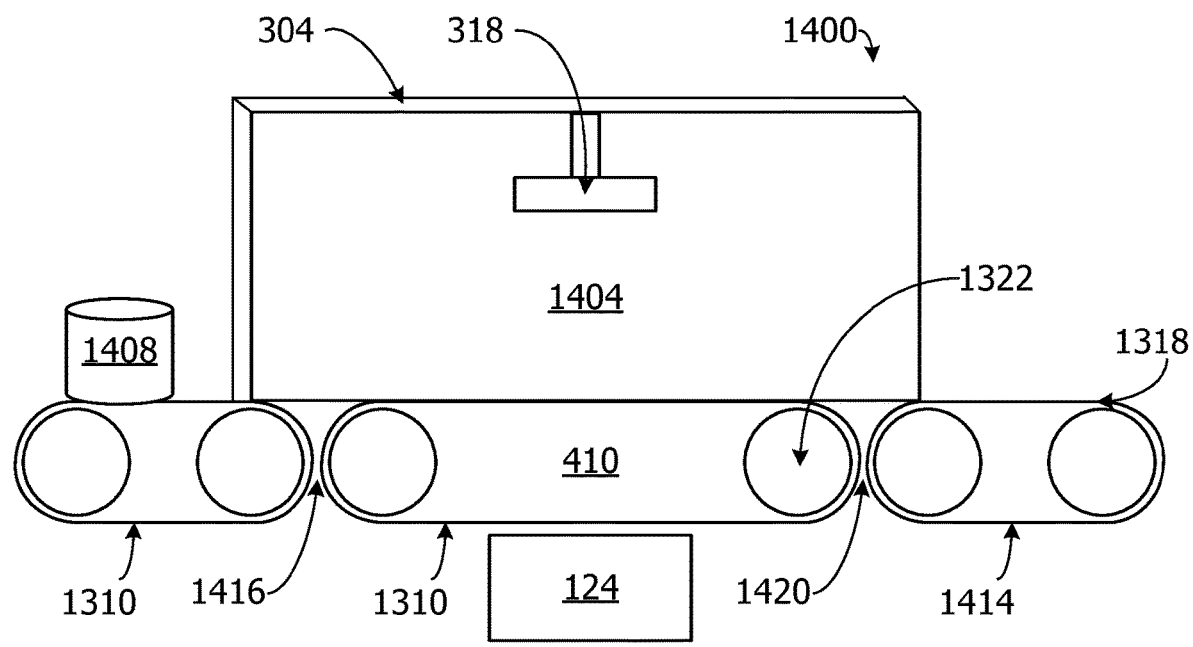
FIG. 14 is an exemplary block diagram illustrating a side cross-section view of a sweeper device attached to an interior portion of a top member of a scanning tunnel.

FIG. 14 is an exemplary block diagram illustrating a side cross-section view of a sweeper device 318 attached to an interior portion 1404 of a top member 304 of a scanning tunnel 1400. If an item 1408 moving along a first conveyor belt 1410 becomes wedged in a gap 1416 between the first conveyor belt 1410 and the rolling transparent scan platform 410, the sweeper device 318 pushes the item 1408 onto the rolling transparent scan platform 410. A scanner device 124 located beneath the rolling transparent scan platform 410 scans the item 1408 as it passes by overhead. If the item 1408 becomes wedged in a gap 1420 between the rolling transparent scan platform 410 and a second conveyor belt 1414, the sweeper device 318 pushes the item onto the second conveyor belt 1414.

Figure 15:
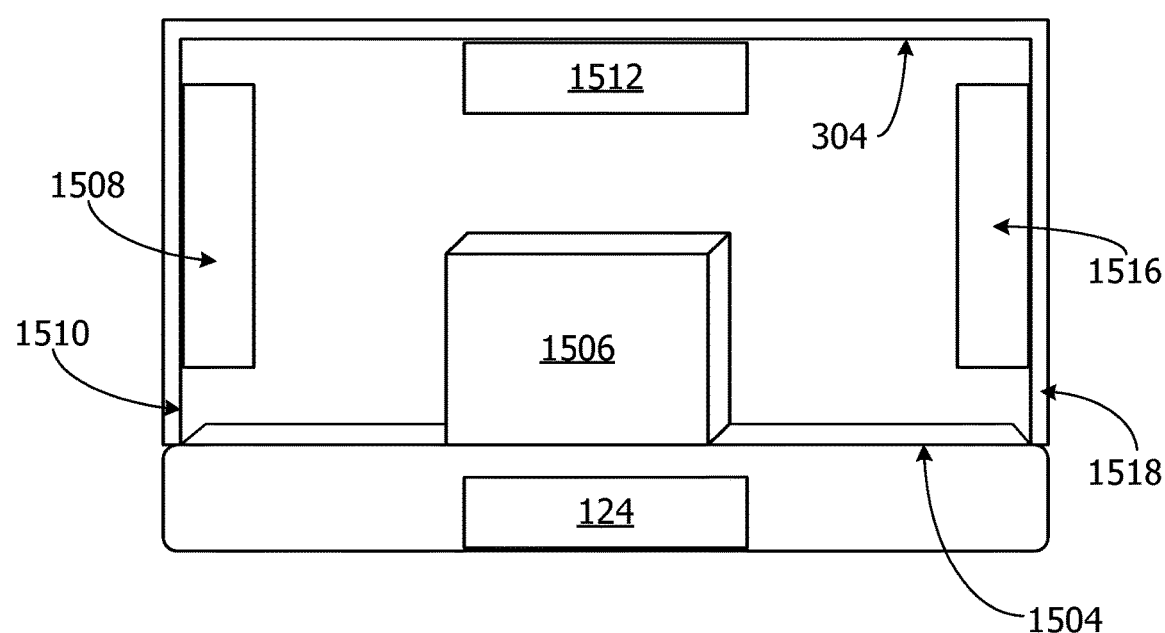
FIG. 15 is an exemplary block diagram illustrating a front cross-section view of a scanning tunnel.

FIG. 15 is an exemplary block diagram illustrating a front cross-section view of a scanning tunnel 1500. The scanning tunnel 1500 includes a scanner device 124 embedded within a transparent scan platform 1504. The scanner device scans an item 1506 within the scanning tunnel 1500. The scanning tunnel can optionally also include a set of one or more sensor devices attached to the interior of the scanning tunnel 1500. The set of sensor devices in this non-limiting example includes scanner device 1508 attached to a first side member, scanner device 1512 associated with a top member 304 of the scanning tunnel and scanner device 1516 attached to the second side member, such as, but not limited to, the first side member 306 in FIG. 3.

The transparent scan platform 1504 can be a stationary (non-moving) platform. In other examples, the transparent scan platform 1504 in other examples can be a rolling platform that carries the item 1608 towards an exit portal, such as, but not limited to, the rolling transparent scan platform 410.

Figure 16:
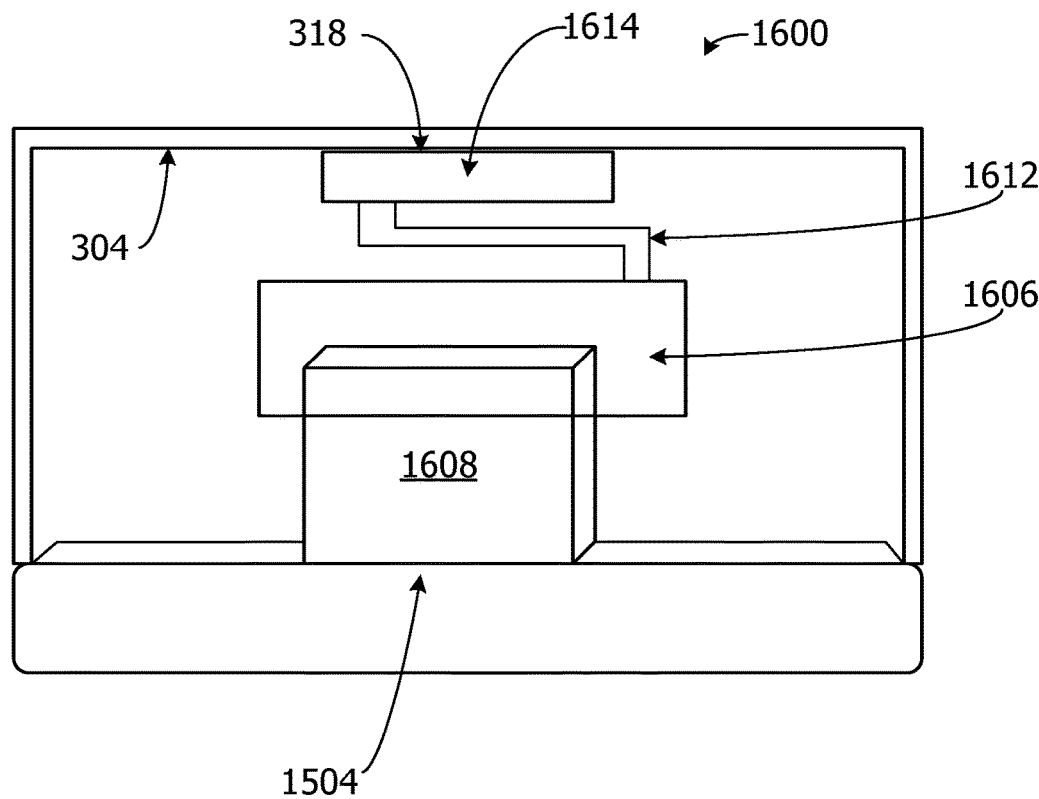
FIG. 16 is an exemplary block diagram illustrating a partially extended sweeper device attached to a side member of a scanning tunnel.
Figure 17:
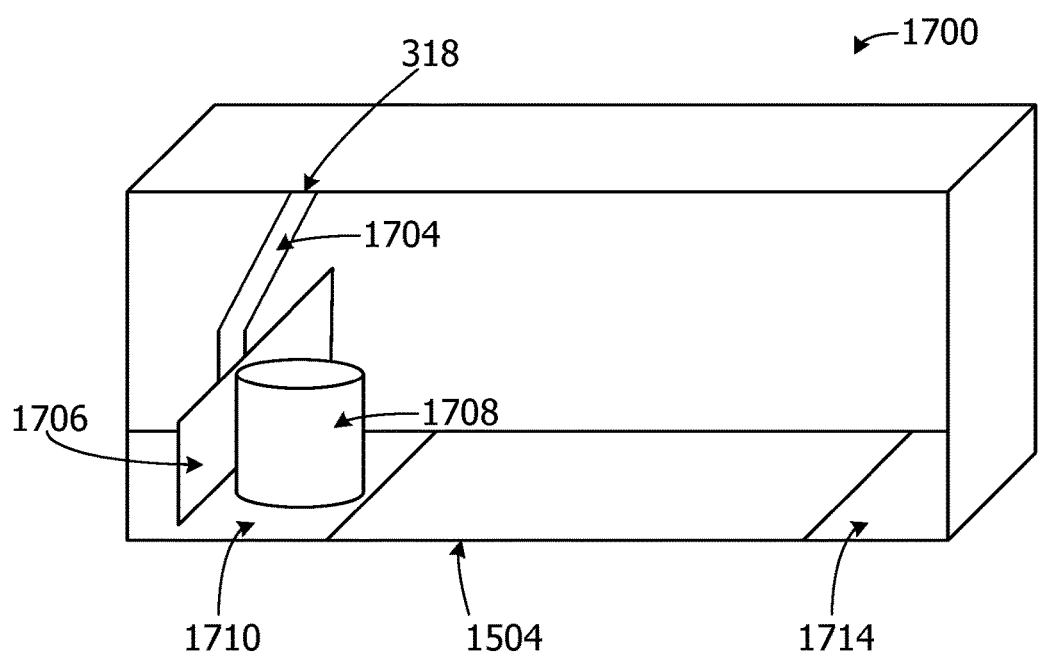
FIG. 17 is an exemplary block diagram illustrating a fully extended sweeper device attached to a top member of a scanning tunnel.

FIG. 16 is an exemplary block diagram illustrating a partially extended sweeper device 318 attached to a top member 304 of a scanning tunnel 1600. The sweeper device 318 includes a sweeper head 1606 for pushing or guiding an item 1608 along a transparent scan platform 1504.

The sweeper device 318 includes an extension arm 1612 connected to the sweeper head 1606 at one end and an attachment point 1614 at another end. The sweeper device 318 is connected to the top member of the scanning tunnel 1600 via the attachment member. The sweeper device 318 can be permanently attached to the interior portion of the scanning tunnel via the attachment member or removably attached to the interior surface of the top member via the attachment member. For example, the attachment member can include a clamp or latch for attaching the sweeper arm. In some examples, the sweeper device 318 includes a set of wires which connect the sweeper device 318 to a power source. The set of wires can run through the extension arm and into the scanning tunnel via the attachment point 1614.

FIG. 18 is an exemplary block diagram illustrating a fully extended sweeper device 318 attached to a top member 304 of a scanning tunnel 1700. The sweeper device 318 includes an extended extension arm 1704 attached to a sweeper head 1706. The sweeper head 1706 pushes/guides an item 1708 off a first conveyor belt 1710 partially within the scanning tunnel onto a transparent scan platform 1504. After scanning, the sweeper device 318 pushes/guides the item 1704 onto a second conveyor belt 1714 which carries the item 1708 out of the scanning tunnel 1700.

FIG. 18 is an exemplary block diagram illustrating a cross-section view of a scanning tunnel 1800 enclosing a fully extended sweeper device 318 attached to a side member 1804 of the scanning tunnel 1800. The sweeper device 318 includes an extension arm 1806 which folds/unfolds or extends and retracts to move a sweeper head 1808 into position behind an item 1810. The sweeper head 1808 pushes the item 1810 along a transparent scan platform 1504 within the scanning tunnel 1800.

FIG. 19 is an exemplary block diagram illustrating a cross-section view of an interior of a side wall of a scanning tunnel 1900 including a fully retracted sweeper device 318. The sweeper device 318 is a device for pushing, sliding, pulling or otherwise moving an item from one location, position or orientation to a different location, position or orientation.

The sweeper device 318 includes an extension arm 1904 attached to a sweeper head 1906. The sweeper head 1906, in this example, is rectangular shaped. However, the examples are not limited to a rectangular shaped sweeper head. The sweeper head, in other examples, is square shaped, round, oval shaped, or any other shape.

The sweeper device 318 is attached to an interior surface 1908 of the scanning tunnel 1900. The sweeper device 318 in some examples is attached to a top member of the scanning tunnel or a side member of the scanning tunnel. In other examples, the sweeper device 318 is attached at an entry portal/opening into the scanning tunnel.

The sweeper device 318 in this example is in a folded or retracted configuration. In this folded state, the extension arm is folded or compressed, and the sweeper head is folded against the side or top of the scanning tunnel.

The continuous transparent band in an example includes multiple transparent segments connected together to form a flexible transparent band. The transparent segments can be composed of glass, plastic or any other transparent substance.

In this example, the subset of transparent segments is a subset of all the transparent segments within the segmented transparent rolling platform. The subset of segments in this non-limiting example includes a transparent segment connected to a transparent segment. The transparent segment is connected to another transparent segment which is also connected to another segment, etc. The examples are not limited to the number of segments illustrated in this example. The continuous transparent band can include any number of transparent segments connected together to form a flexible, transparent band turning about a set of rollers. A scanner device is mounted below the continuous transparent band or mounted within the transparent band (not shown).

Figure 20:
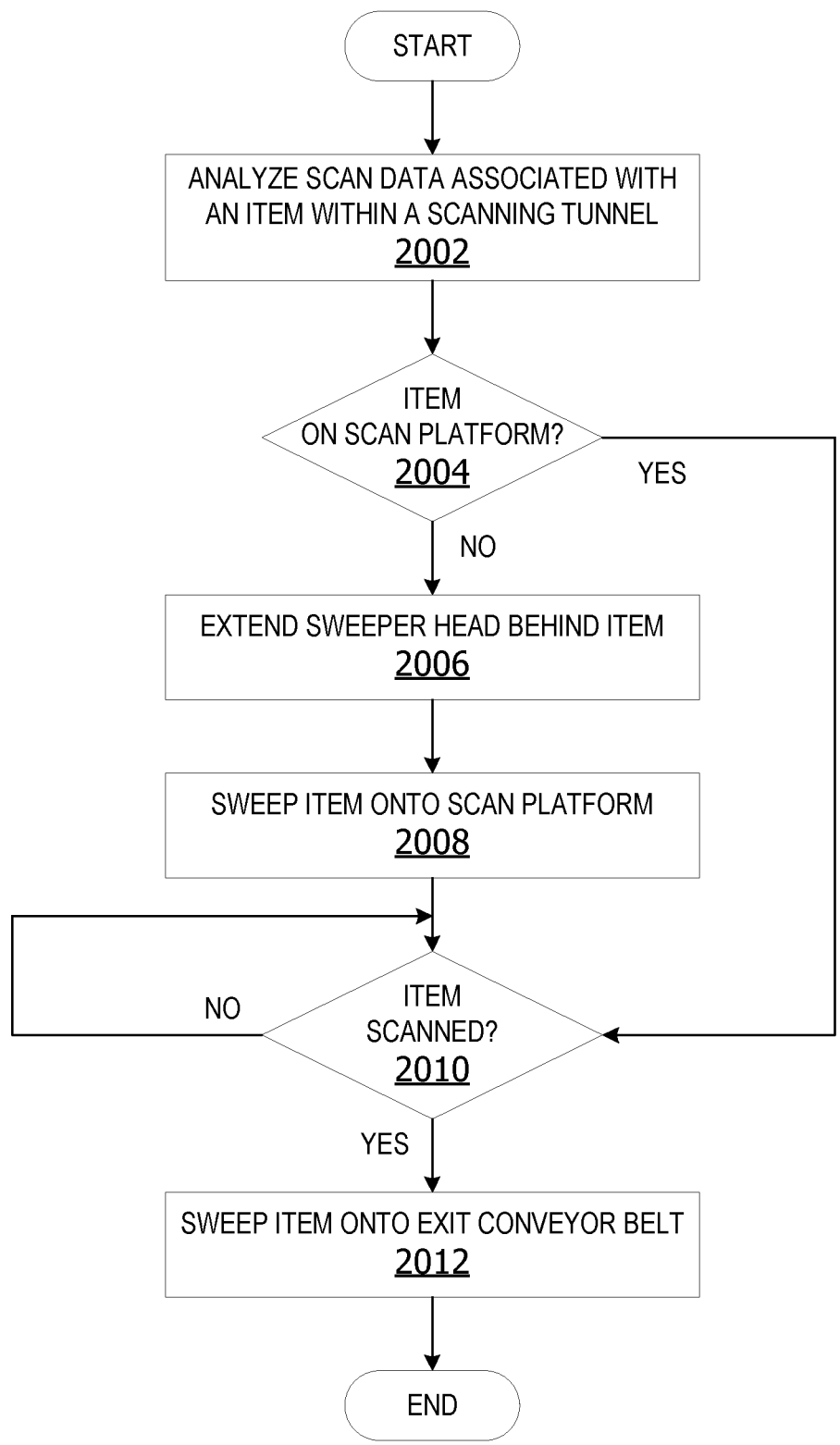
FIG. 20 is an exemplary flow chart illustrating operation of the computing device to control a sweeper device to move items within a scanning tunnel.

FIG. 20 is an exemplary flow chart illustrating operation of the computing device to control a sweeper device to move items within a scanning tunnel. The sweeper device is a device, such as, but not limited to, the sweeper device 318 in FIG. 3. The process shown in FIG. 20 can be performed by a scan controller component, executing on a computing device, such as the computing device 102 or the user device in FIG. 1.

The process begins by analyzing scan data associated with an item within a scanning tunnel at 2002. The scan data is data generated by a scanner device, such as, but not limited to, the scan data 206 in FIG. 2. The scan controller component determines if the item is on the transparent scan platform at 2004. The transparent scan platform is a platform, such as, but not limited to, the transparent scan platform 1504 in FIG. 15.

If no, the sweeper head is extended behind the item at 2006. The scan controller component is a component for controlling the item scan device, such as, but not limited to, the scan controller component 134 in FIG. 1 and FIG. 2. The sweeper head sweeps the item onto the scan platform at 2008. The scan controller component determines if the item is scanned at 2010. If yes, the sweeper device sweeps the item onto the exit conveyor belt at 2012. The process terminates thereafter.

While the operations illustrated in FIG. 20 are performed by a computing device, aspects of the disclosure contemplate performance of the operations by other entities. For example, a cloud service can perform one or more of the operations.

Additional Examples

In some examples, a conveyor belt system for scanning items autonomously is provide. The system includes a segmented transparent scan platform within an item scanning tunnel. The segmented transparent scan platform rolls to move an item across an embedded scanner device for automated scanning of items within the tunnel. A sweeper mechanism pushes items off the scan platform onto a conveyor belt exiting the scanning tunnel.

The system in some examples consists of one or more transparent conveyor belts and one or more scanner devices associated with the transparent conveyor belt(s) for scanning a barcode on a surface of an item in contact with the conveyor belt(s). In one example, the system includes an opaque conveyor belt and a transparent conveyor belt on the same horizontal plane. As an item passes from the opaque conveyor belt to the transparent conveyor belt, a scanner device located beneath the transparent segmented conveyor belt scans a barcode or other item identifier on a surface of the item in contact with the transparent conveyor belt.

The system in still other examples provides a barcode scanner device associated with a checkout/cashier register. The device includes a box or tunnel enclosing a plurality of scanner devices/optical sensors scanning an item from all sides regardless of orientation of the item. Barcodes on the bottom of items are read by a scanner device positioned below a transparent panel between successive conveyor belts inside the scanner box. The scanner device reads any bottom-side barcodes as the barcode moves over the transparent scanning platform.

In an example scenario, the system incorporates a plurality of scanners within a box-like configuration around the transparent scan platform to capture barcode data on the item/object regardless of item/object orientation. If an item passes through the scanning area without being scanned, the system emits an alarm/alert identifying the item for rescanning or manual scanning.

In one example, the transparent scanning platform is composed of a clear, flexible plastic belt or band that rolls over rollers on each side. The flexible plastic belt runs over the top of the scanner device and under the bottom of the scanner device. In still other examples, the transparent scanning platform is composed of a plurality of glass segments or clear plastic segments interconnected together such that the segments roll flexibly.

The width of the transparent scanning platform is equal to the width of the conveyor belt(s) leading into the scanning box and/or leading out of the scanning box. The width in some examples is equal to or greater than the width of the item identifier on each item (barcode). In one example, the width of the transparent scan platform is a foot wide. In another example, the width of the transparent scan platform is six inches wide. In still another example, the width of the transparent scan platform is two inches wide. In yet other examples, the width of the transparent scan platform is only six centimeters wide.

The transparent scanning platform in other examples is provided on the same plane as a first conveyor belt entering the scanning box and a second conveyor belt exiting the scanning box. The transparent scanning platform rolls in the same direction as the first and second conveyor belt. The speed at which the transparent scanning platform rolls is synced to the speed of the first conveyor belt and the second conveyor belt.

The scanning box enclosing the transparent scan platform is sized to create a tunnel over a portion of the first conveyor belt moving objects through an entrance of the scanning box, all the transparent scan platform and a portion of the second conveyor belt moving objects out through an exit point of the scanning box. The scanning box is sized to accommodate the largest item which can be scanned within the box. In some examples, the scanning box is two cubic feet in size. In other examples, the scanning box is three cubic feet (three feet high, three feet wide, and three feet long). In still other examples, the scanning box is only four or five cubic inches to accommodate smaller items, such as jewelry. If large items are scanned, the scanning box can be five or ten cubic feet in size. Thus, the dimensions of the scanning box are user-configured to accommodate the size of the items being scanned.

A gap exists between the transparent scan platform and at least one conveyor belt at an exit point of the scanning box and/or the entry point into the scanning box in some examples. The conveyor belt(s) are located as closely to the transparent scan platform as possible to minimize the gap between the transparent scan platform and the at least one conveyor belt. The transparent scanning platform is a segmented transparent material "window" or transparent band. A sweeper device prevents items from falling into any gaps between the transparent scanning platform and the conveyor belt(s). A narrow gap prevents small items from becoming lodged in within the gap.

If an item becomes stuck between a gap between the transparent scan platform and a conveyor belt, a sweeper device extends down from an interior portion of the scanning box at an entrance point of the scanner box. The sweeper device sweeps the item off the first conveyor belt onto the transparent scan platform for scanning. When scanning is complete, the sweeper device sweeps the item onto a second conveyor belt which moves the item out of the scanning box at an exit point. The sweeper device retracts or folds back into its original holding position within the interior of the scanning box.

The sweeper device in some examples attaches to the upper interior surface (top) of the scanning box. In other examples, the sweeper device connects to an interior portion of one of the sides of the scanning box.

In some examples, if an item passes through the scanning tunnel/box without being scanned by at least one sensor device, the system outputs an alert to a user via a user interface device. In other examples, the system transmits an alert notification indicating an item passed through the scan box/tunnel without being scanned to a user device via a network.

Alternatively, or in addition to the other examples described herein, examples include any combination of the following:
  an alert device configured to output an alert on condition the plurality of scanner devices fails to generate scan data associated with the at least one item;
  a memory; at least one processor communicatively coupled to the memory; and an item identification component, implemented on the at least one processor, analyzes the scan data to identify the at least one item;
  an alert generation component, implemented on the at least one processor, generates an alert on condition analysis of the scan data indicates multiple items entering the scanning tunnel simultaneously;
  the plurality of scanner devices comprising a set of scanner devices attached to an interior surface of the first side member, a set of scanner devices attached to an interior surface of the second side member, and a set of scanner devices attached to an interior surface of the top member;
  wherein each segment in the plurality of transparent segments is composed of glass or plastic;
  wherein the first conveyor belt, the second conveyor belt and the rolling transparent scan platform have a same width, and wherein a length of the sweeper head is equal to a width of the rolling transparent scan platform;
  a user-selected uniform speed, wherein the first conveyor belt, the second conveyor belt and the rolling transparent scan platform move at the user-selected uniform speed;
  the sweeper device retracts upward on condition the sensor data indicates the item is outside the scanning tunnel;
  a plurality of sensor devices within the scanning tunnel, the plurality of sensor devices further comprises at least one of a barcode reader, a radio frequency identifier (RFID) tag reader, a quick response (QR) code reader, a matrix barcode reader, an image capture device, or a universal product code (UPC) code;
  an alert generation component, implemented on the at least one processor, generates an alert on condition analysis of the scan data indicates a plurality of items entering the scanning tunnel simultaneously;
  a user-selected uniform speed, wherein the first conveyor belt, the second conveyor belt and the transparent conveyor belt move at the user-selected uniform speed;
  wherein the first conveyor belt, the second conveyor belt, the transparent conveyor belt, and the sweeper head have a uniform width;
  a sweeper device comprising an attachment point on a first end of an extension arm connected to a portion of the interior surface of the item scanning tunnel and a sweeper head connected to a second end of the extension arm, the extension arm extending the sweeper head downward behind the item and sweeping the item onto the second conveyor belt on condition the item becomes lodged in a gap between the rolling transparent scan platform and the second conveyor belt;
  the sweeper device retracts upward on condition the scan data indicates the item is outside the scanning tunnel;
  wherein a length of the sweeper head is equal to a width of the rolling transparent scan platform; and
  an alert device configured to output an alert on condition the scanner device fails to generate scan data associated with the at least one item.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19 and FIG. 20 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19 and FIG. 20, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19 and FIG. 20.

In some examples, the operations illustrated in FIG. 20 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for automated item scanning via a transparent scanning platform. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, and FIG. 19, such as when encoded to perform the operations illustrated in FIG. 20, constitute exemplary means for detecting an item entering a scanning tunnel; exemplary means for activating a rolling transparent scan platform to move an item toward an exit point of the scanning tunnel onto a second conveyor belt on the same horizontal plane as the rolling transparent scan platform; exemplary means for activating a sweeper device to extend downward behind the item; exemplary means for sweeping the item onto the second conveyor belt on condition the item becomes lodged in a gap between the rolling transparent scan platform and a second conveyor belt; and exemplary means for retracting a sweeper device upward on condition the scan data indicates the at least one item is outside the scanning tunnel.

Other non-limiting examples provide one or more computer storage devices having a first computer-executable instructions stored thereon for item scanning via a transparent rolling platform, such as, but not limited to, a transparent conveyor belt or a transparent segmented belt. When executed by a computer, the computer performs operations including detecting an item entering a scanning tunnel; activating a rolling transparent scan platform to move an item toward an exit point of the scanning tunnel onto a second conveyor belt on the same horizontal plane as the rolling transparent scan platform; activating a sweeper device to extend downward behind the item; exemplary means for sweeping the item onto the second conveyor belt on condition the item becomes lodged in a gap between the rolling transparent scan platform and a second conveyor belt; and retracting a sweeper device upward on condition the scan data indicates the at least one item is outside the scanning tunnel.

Other non-limiting examples provide one or more computer storage devices having a first computer-executable instructions stored thereon for providing scanning items via a transparent scan platform. When executed by a computer, the computer performs operations including detecting an item entering a scanning tunnel; activating a rolling transparent scan platform to move an item toward an exit point of the scanning tunnel onto a second conveyor belt on the same horizontal plane as the rolling transparent scan platform; activating a sweeper device to extend downward behind the item; sweeping the item onto the second conveyor belt on condition the item becomes lodged in a gap between the rolling transparent scan platform and a second conveyor belt; and retracting a sweeper device upward on condition the scan data indicates the at least one item is outside the scanning tunnel.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for scanning items via an item scanning tunnel, the system comprising:

a first conveyor belt moves at least one item towards the item scanning tunnel;

the item scanning tunnel comprising a first side member, a second side member, a top member, and a rolling transparent scan platform along a same horizontal plane as the first conveyor belt, the first conveyor belt moving the at least one item into the item scanning tunnel;

a plurality of sensor devices attached to an interior surface of the item scanning tunnel, the plurality of sensor devices including a scanner device associated with the rolling transparent scan platform, the scanner device generate scan data associated with the at least one item;

the rolling transparent scan platform comprising a set of transparent segments, a first segment in the set of transparent segments comprising a first side attached to a second segment and a second side of the first segment attached to a third segment, the set of transparent segments comprising a continuous transparent band rotating about a set of rollers;

the scanner device connected to the first side member of the item scanning tunnel;

a main body of the scanner device extends between the set of rollers within the continuous transparent band, the scanner device scans an item identifier on an exterior surface of the at least one item in contact with the rolling transparent scan platform through a subset of transparent segments within the set of transparent segments;

the rolling transparent scan platform moves the at least one item toward an exit point of the item scanning tunnel and onto a second conveyor belt on the same horizontal plane as the rolling transparent scan platform;

a sweeper device comprising an attachment point on a first end of an extension arm connected to a portion of the interior surface of the item scanning tunnel; and a sweeper head connected to a second end of the extension arm, the extension arm extends the sweeper head downward behind the at least one item and sweeps the at least one item onto the second conveyor belt, the sweeper device retracts upward on condition the scan data indicates the at least one item is outside the item scanning tunnel.

2. The system of claim 1, further comprising:
   a transmitter device sends the scan data associated with the at least one item to a transaction component on condition the scanner device generates the scan data associated with the at least one item.

3. The system of claim 1, further comprising:
   an alert device outputs an alert on condition the plurality of sensor devices fails to generate the scan data associated with the at least one item.

4. The system of claim 1, further comprising:
   a memory;
   at least one processor communicatively coupled to the memory; and
   an item identification component, implemented on the at least one processor, analyzes the scan data to identify the at least one item.

5. The system of claim 4, further comprising:
   an alert generation component, implemented on the at least one processor, generates the alert on condition analysis of the scan data indicates multiple items entering the item scanning tunnel simultaneously.

6. The system of claim 1, further comprising:
   the plurality of sensor devices comprising at least one scanner device attached to an interior surface of the first side member, at least one scanner device attached to an interior surface of the second side member, and at least one scanner device attached to an interior surface of the top member.

7. The system of claim 1, wherein each segment in the set of transparent segments is composed of glass or plastic.

8. The system of claim 1, wherein the first conveyor belt, the second conveyor belt and the rolling transparent scan platform have a same width, and wherein a length of the sweeper head is equal to a width of the rolling transparent scan platform.

9. The system of claim 1, further comprising:
   a user-selected uniform speed, wherein the first conveyor belt, the second conveyor belt and the rolling transparent scan platform move at the user-selected uniform speed.

10. An item scan device including an item scanning tunnel, the item scan device comprising:

a first conveyor belt moving an item into the item scanning tunnel;

a set of sensor devices attached to an interior surface of the item scanning tunnel, the set of sensor devices comprising a scanner device;

a transparent conveyor belt on a same horizontal plane as the first conveyor belt and moving at a same speed as the first conveyor belt, the transparent conveyor belt comprising a continuous transparent band of flexible material rotating about a set of rollers;

the scanner device comprising a first side connected to a first side member of the item scanning tunnel and a main body of the scanner device extending between the set of rollers, the scanner device positioned below an upper portion of the continuous transparent band and above a lower portion of the continuous transparent band, the scanner device generating sensor data associated with an item identifier on a surface of the item in contact with an exterior surface of the upper portion of the continuous transparent band;

the transparent conveyor belt moving the item toward an exit portal of the item scanning tunnel onto a second conveyor belt on the same horizontal plane as the transparent conveyor belt;

a sweeper device comprising an attachment point on a first end of an extension arm connected to a portion of the interior surface of the item scanning tunnel; and a sweeper head connected to a second end of the extension arm, the extension arm extends the sweeper head downward behind the item and sweeps the item onto the second conveyor belt on condition the item becomes lodged in a gap between the transparent conveyor belt.

11. The item scan device of claim 10, further comprising:
the sweeper device retracts upward on condition the sensor data indicates the item is outside the item scanning tunnel.

12. The item scan device of claim 10, wherein the set of sensor devices further comprises at least one of a barcode reader, a radio frequency identifier (RFID) tag reader, a quick response (QR) code reader, a matrix barcode reader, an image capture device, or a universal product code (UPC) code.

13. The item scan device of 10, further comprising:
an alert generation component, implemented on the at least one processor, generates an alert on condition at least two items enter the item scanning tunnel simultaneously.

14. The item scan device of 10, further comprising:
a user-selected uniform speed, wherein the first conveyor belt, the second conveyor belt and the transparent conveyor belt move at the user-selected uniform speed.

15. The item scan device of 10, wherein the first conveyor belt, the second conveyor belt, the transparent conveyor belt, and the sweeper head have a uniform width.

16. A transparent rolling scan platform within an item scanning tunnel, the transparent rolling scan platform comprising:

the item scanning tunnel comprising a first side member, a second side member, a top member, and a rolling transparent scan platform;

the rolling transparent scan platform comprising a set of transparent segments, a first segment in the set of transparent segments comprising a first side attached to a second segment and a second side of the first segment attached to a third segment, the set of transparent segments comprising a continuous transparent band rotating about a set of rollers;

a scanner device positioned below the rolling transparent scan platform, the scanner device scanning an item identifier on a surface of an item in contact with the rolling transparent scan platform through a subset of transparent segments within the set of transparent segments; and the rolling transparent scan platform moving the item toward an exit point of the item scanning tunnel onto a conveyor belt on a same horizontal plane as the rolling transparent scan platform.

17. The transparent rolling scan platform of claim 16, further comprising:
a sweeper device comprising an attachment point on a first end of an extension arm connected to a portion of an interior surface of the item scanning tunnel; and a sweeper head connected to a second end of the extension arm, the extension arm extends the sweeper head downward behind the item and sweeps the item onto the conveyor belt on condition the item becomes lodged in a gap between the rolling transparent scan platform and the conveyor belt.

18. The transparent rolling scan platform of claim 17, further comprising:
the sweeper device retracts upward on condition scan data indicates the item is outside the item scanning tunnel.

19. The transparent rolling scan platform of claim 17, wherein a length of the sweeper head is equal to a width of the rolling transparent scan platform.

20. The transparent rolling scan platform of claim 16, further comprising:
an alert device configured to output an alert on condition the scanner device fails to generate scan data associated with the item.

* * * * *